United States Patent
Hayashida (10) Patent No.: US 8,844,153 B2
(45) Date of Patent: Sep. 30, 2014

(54) MICROMETER

(71) Applicant: Mitutoyo Corporation, Kawasaki (JP)

(72) Inventor: Shuji Hayashida, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 222 days.

(21) Appl. No.: 13/651,784

(22) Filed: Oct. 15, 2012

(65) Prior Publication Data
US 2013/0091720 A1  Apr. 18, 2013

(30) Foreign Application Priority Data

Oct. 18, 2011  (JP) .................. 2011-228997

(51) Int. Cl.
*G01B 3/18*  (2006.01)
(52) U.S. Cl.
CPC ....................... *G01B 3/18* (2013.01)
USPC ........................................................... 33/819
(58) Field of Classification Search
USPC ............................................ 33/813, 819, 828
See application file for complete search history.

(56) References Cited

U.S. PATENT DOCUMENTS

| | | | | |
|---|---|---|---|---|
| 4,578,868 A | * | 4/1986 | Sasaki et al. ..................... | 33/819 |
| 5,495,677 A | * | 3/1996 | Tachikake et al. .............. | 33/819 |
| 6,247,244 B1 | * | 6/2001 | Zanier et al. ..................... | 33/819 |
| 6,553,685 B2 | * | 4/2003 | Nishina et al. .................. | 33/813 |
| 8,245,413 B2 | * | 8/2012 | Hayashida et al. ............. | 33/828 |
| 2008/0010850 A1 | * | 1/2008 | Hayashida et al. ............. | 33/819 |
| 2009/0282689 A1 | * | 11/2009 | Hayashida et al. ............. | 33/819 |

FOREIGN PATENT DOCUMENTS

| | | |
|---|---|---|
| DE | 20 2010 015087 U1 | 5/2011 |
| GB | 2 406 647 A | 4/2005 |
| JP | A-2005-227080 | 8/2005 |

OTHER PUBLICATIONS

"QuadraMic Electronic 4-Way Reading Micrometer," Fred V. Fowler Company, Inc., Jun. 15, 2004, p. 23.
Jan. 17, 2013 European Search Report issued in Application No. 12007192.3.

* cited by examiner

*Primary Examiner* — G. Bradley Bennett
(74) *Attorney, Agent, or Firm* — Oliff PLC (57) ABSTRACT

A micrometer includes: a displacement detector that detects a displacement of a spindle; a display device that is rotatably attached to a fixed sleeve; and a control device that controls the display device. The display device includes: an image display section that displays an image including a measurement value based on the displacement detected by the displacement detector; a surface member that faces the image display section and has a touch surface; a position sensor that detects a position pressed on the touch surface; and a support member that supports the image display section, the surface member and the position sensor while the touch surface is exposed to an outside, the support member being rotatably attached to the fixed sleeve.

4 Claims, 8 Drawing Sheets

MICROMETER

The entire disclosure of Japanese Patent Applications No. 2011-228997 filed Oct. 18, 2011 is expressly incorporated by reference herein.

BACKGROUND OF THE INVENTION

1. Field of the Invention

The present invention relates to a digital display micrometer.

2. Description of Related Art

Some of known digital display micrometers are arranged so that measurement values displayed on digital displays are readable irrespective of orientations of the micrometers during a measurement (see, for instance, Literature 1: JP-A-2005-227080 (FIGS. 5 and 6)).

The micrometer disclosed in the Literature 1 is provided with a rotary unit that is rotatable around an axis that is parallel to an axial direction of a spindle. The rotary unit is provided thereon with a digital display.

Accordingly, irrespective of whether operating the micrometer only with a right hand (i.e. when a front side of the micrometer is visible) or operating the micrometer only with a left hand (i.e. when a backside of the micrometer is visible), the user can read the measurement value displayed on the digital display by rotating the rotary unit.

Incidentally, an operation button for changing a display status of the measurement value displayed on the digital display is provided to the typical digital display micrometers.

For instance, the micrometer disclosed in the Literature 1 includes at a front side thereof a reset button for setting the measurement value to zero and a hold button for holding the displayed measurement value.

Since the micrometer disclosed in the Literature 1 includes the operation button at the front side thereof, a user can operate (press) the operation button when the micrometer is operated only with a right hand (i.e. when the front side of the micrometer is visible). However, when the micrometer is operated only with a left hand, a user cannot operate the operation button since the operation button is not provided on the backside, thereby impairing the usability of the micrometer.

SUMMARY OF THE INVENTION

An object of the invention is to provide a micrometer with enhanced usability.

A micrometer according to an aspect of the invention includes a U-shaped body; an anvil provided on a first end of the body; a fixed sleeve fixed on a second end of the body; a spindle that is screwed into the fixed sleeve and advances and retracts in an axial direction thereof; a displacement detector that detects a displacement of the spindle; a display device that is rotatably attached to the fixed sleeve; and a control device that controls the display device, in which the display device comprises: an image display section that displays an image including a measurement value based on the displacement detected by the displacement detector; a surface member that faces the image display section and has a touch surface; a position sensor that detects a position pressed on the touch surface; and a support member that supports the image display section, the surface member and the position sensor with the touch surface being exposed to an outside, the support member being rotatably attached to the fixed sleeve.

According to the above aspect of the invention, the display device (support member) that displays the image including the measurement value is rotatably attached to the fixed sleeve.

Accordingly, irrespective of whether operating the micrometer only with a right hand or operating the micrometer only with a left hand, the user can read the measurement value by rotating the display device relative to the fixed sleeve so that the display device is situated at a position at which the image is visible.

Further, the display device is provided by a so-called touch panel including the image display section, the surface member and the position sensor.

Thus, the operation button such as a typical reset button and hold button can be displayed on the image display section in the form of the operation object in addition to the measurement value. In other words, by tapping the operation object displayed on the image display section (i.e. pressing the position on the touch surface corresponding to the operation object), the same function as those provided when typical operation buttons such as the reset button and the hold button are pressed can be provided.

When the image including the operation object is displayed on the image display section, the user can locate the display device at a position capable of visually recognizing the operation object in addition to the measurement value by rotating the display device relative to the fixed sleeve.

Thus, irrespective of which hand (i.e. only a right hand or only a left hand) of the user is used for operating the micrometer, the measurement value can be read and the operation object can be tapped, so that usability of the micrometer can be enhanced.

In the micrometer according to the above aspect of the invention, the control device preferably includes: a rotary position determining unit that recognizes a rotary position of the support member relative to the fixed sleeve; and a display controller that displays an image on the image display section, in which the display controller inverts an upper side and a lower side of the image displayed on the image display section in accordance with the rotary position of the support member recognized by the rotary position determining unit.

According to the above arrangement, since the control device includes the rotary position determining unit and the display controller, the orientation from the top to the bottom of the image visually recognized by the user can be aligned with the orientation in the vertical direction irrespective of which hand (i.e. only a right hand or only a left hand) is used by the user.

Accordingly, an erroneous reading of the measurement value by the user or an erroneous recognition of the operation object can be avoided.

In the micrometer according to the above aspect of the invention, a finger rest that bulges from an outer circumference of the U-shaped body in the axial direction of the spindle is provided on the second end of the body.

When an object is measured while the body is directly held by hand, the heat of the hand is transferred to the body. After being held for a long time, the body is thermally expanded, which results in an error in the measurement value.

Since the finger rest is provided near the second end of the body, the user can hold the micrometer while hooking the little finger on the finger rest (i.e. without touching the body).

Thus, when the finger rest is provided by a material with low heat conductivity, the heat is not transferred from the hand of the user to the body and, consequently, thermal expansion of the body can be avoided. Accordingly, the error due to the thermal expansion of the body can be avoided and the object can be highly accurately measured.

DESCRIPTION OF EMBODIMENT(S)

An exemplary embodiment of the invention will be described below with reference to the attached drawings.

Arrangement of Micrometer

Figure 1:
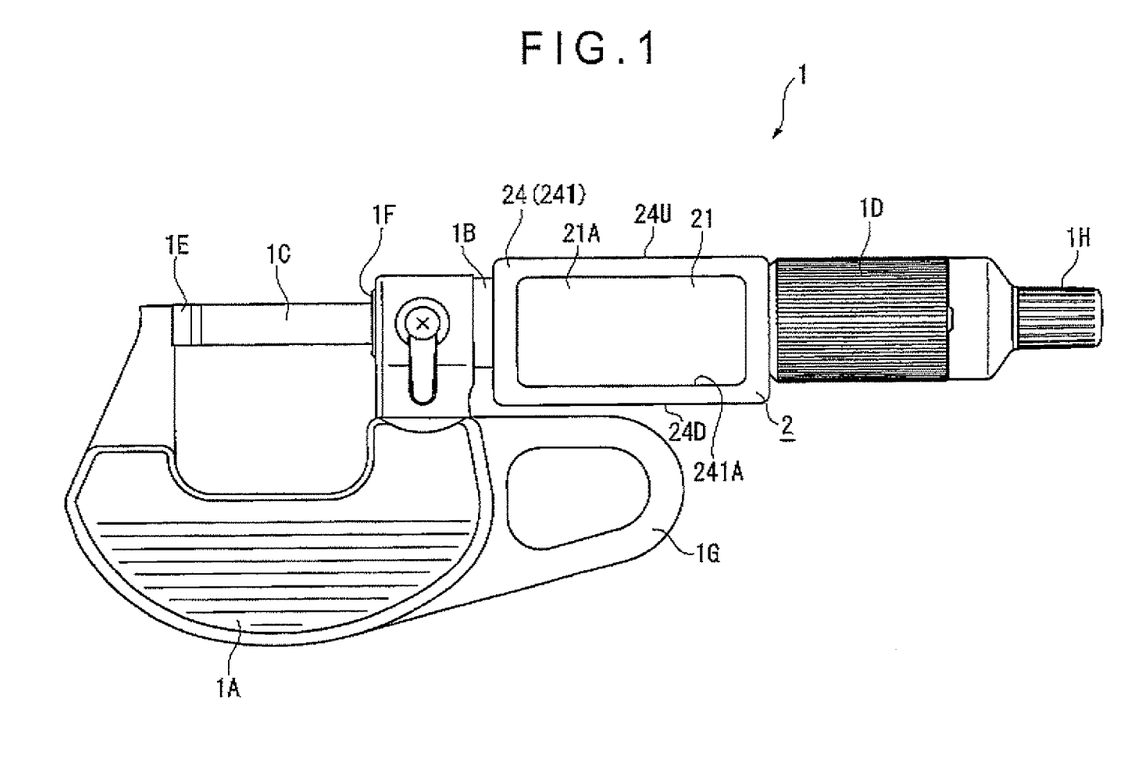
FIG. 1 is a front elevation showing an arrangement of a micrometer according to an exemplary embodiment of the invention.

FIG. 1 is a front elevation showing an arrangement of a micrometer 1 according to the exemplary embodiment of the invention.

It should be noted that images displayed on a digital display 2 are not shown in FIG. 1 for the convenience of description.

Figure 4:
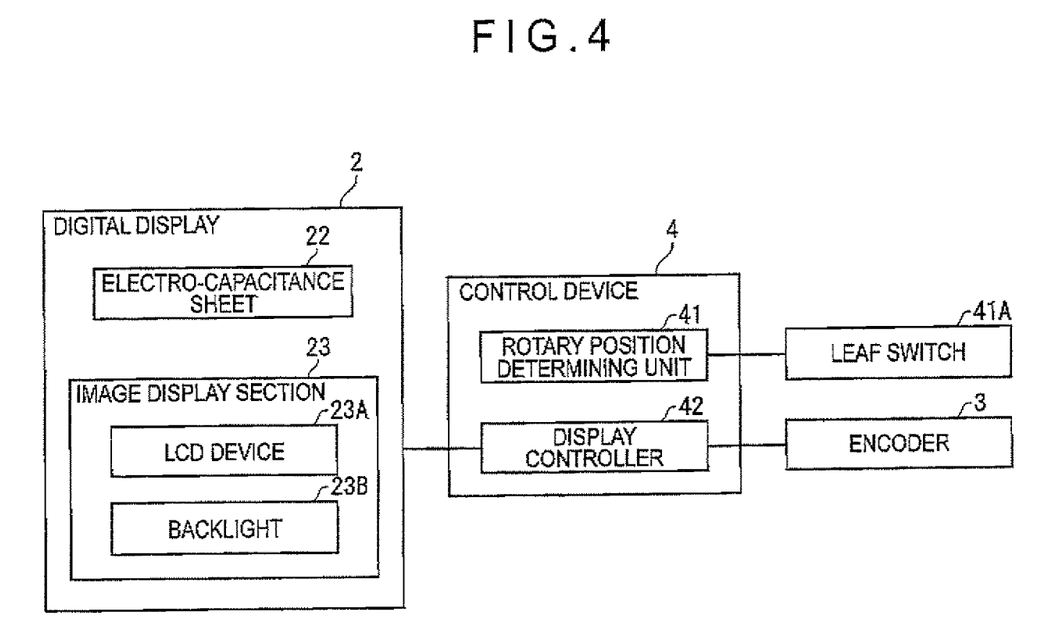
FIG. 4 is a block diagram showing an arrangement of a control device according to the exemplary embodiment.

As shown in FIG. 1, the micrometer 1 includes a body 1A, a fixed sleeve 1B, a spindle 1C, a thimble 1D, a digital display 2 (display device), an encoder 3 (displacement detector) (see FIG. 4) and a control device 4 (see FIG. 4).

Since the components 1A to 1D are well known components used in typical micrometers, the description of the components 1A to 1D will be simplified below.

As shown in FIG. 1, the body 1A is a substantially U-shaped member.

An anvil 1E is rigidly attached to a first end of the body 1A. A bearing cylinder 1F into which the spindle 1C is adapted to be inserted is provided to a second end of the body 1A. A finger rest 1G made of a material (e.g. a synthetic resin material) with lower thermal conductivity and higher heat-insulating properties is provided to the second end of the body 1A.

Specifically, the finger rest 1G is a substantially U-shaped member. Both ends of the finger rest 1G are fixed on an outer side of the U-shaped body 1A in a manner that the finger rest 1G bulges from the outer side of the U-shaped body 1A along the axial direction of the spindle 1C.

As shown in FIG. 1, the fixed sleeve in is fixed to the second end of the body 1A.

The fixed sleeve 1B threadably receives the spindle 1C to support the spindle 1C together with the bearing cylinder 1F.

The spindle 1C is inserted into the bearing cylinder 1F and is screwed into the fixed sleeve 1B. The spindle 1C advances and retracts relative to the anvil 1E when the screwing condition of the spindle 1C against the fixed sleeve 1B is changed (i.e. when the spindle 1C is rotated).

The thimble 1D is rotatably fitted to an outer circumference of the fixed sleeve 1B. An outer end (right end in FIG. 1) of the thimble 1D is integrally connected with a base end (an end (left end in FIG. 1) opposite to the end facing the anvil 1E) of the spindle 1C.

As shown in FIG. 1, a ratchet knob 1H that freely rotates when a predetermined or more load is applied on the spindle 1C is provided on the thimble 1D near the base end of the spindle 1C.

When the thimble 1D or the ratchet knob 1H is rotated, the spindle 1C is axially displaced while being rotated to advance or retract relative to the anvil 1E.

Arrangement of Digital Display

As shown in FIG. 1, the digital display 2 is attached to the fixed sleeve 1B and, under the control of the control device 4, the digital display 2 displays an image including a measurement value based on the axial displacement of the spindle 1C detected by the encoder 3.

The digital display 2 includes a surface member 21 (FIG. 1), an electro-capacitance sheet 22 (position sensor) (see FIG. 4), an image display section 23 (see FIG. 4) and a support member 24 (FIG. 1).

The surface member 21 is a cover glass (film) provided by a translucent material. As shown in FIG. 1, one of the plate surfaces 21A (referred to as a touch surface 21A hereinafter) of the surface member 21 is exposed to an outside for an operation of a user.

Though not specifically illustrated, the electro-capacitance sheet 22 is a translucent sheet member including an electrode layer and a substrate layer on which a control IC (Integrated Circuit) is provided. The electro-capacitance sheet 22 is attached to the other of plate surfaces (i.e. backside) of the surface member 21.

When the touch surface 21A is tapped (i.e. pressed) by a user, a capacitor is formed between the electro-capacitance sheet 22 and the finger of the user via the surface member 21. The location of the capacitor on the touch surface 21A (i.e. on which location on the touch surface 21A is tapped) is detected based on a minute change in the electro-capacitance.

The electro-capacitance sheet 22 (control IC) outputs a signal indicating the tapped location on the touch surface 21A to the control device 4.

The image display section 23 faces the surface member 21 with the electro-capacitance sheet 22 interposed therebetween. The image display section 23 displays an image under the control of the control device 4.

The image display section 23 includes an LCD (Liquid Crystal Display) device 23A and a backlight 23B (see FIG. 4).

The LCD device 23A is provided by a transmissive liquid crystal display device that modulates incoming light to form an image.

The backlight 23B is attached to a light-incident side of the LCD device 23A and emits light to the LCD device 23A.

The user visually recognizes the image formed by the LCD device 23A through the surface member 21 and the electro-capacitance sheet 22.

Figure 2:
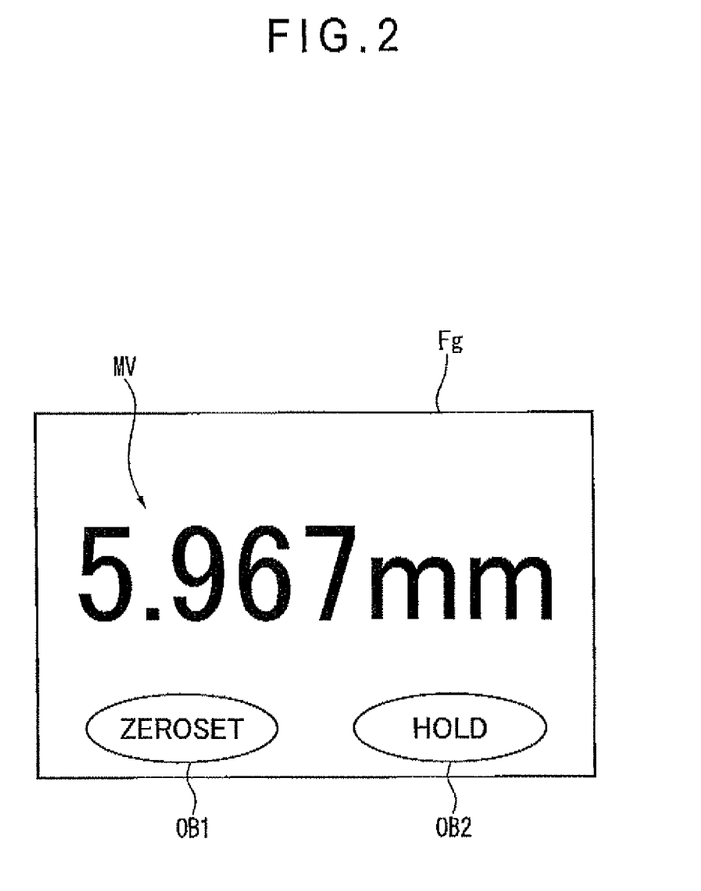
FIG. 2 illustrates an example of an image displayed on a digital display according to the exemplary embodiment.

FIG. 2 illustrates an example of the image displayed on the digital display 2.

The LCD device 23A forms an image Fg shown in FIG. 2.

Specifically, as shown in FIG. 2, the image Fg includes a measurement value MV based on the axial displacement of the spindle 1C detected by the encoder 3, first and second operation objects OB1 and OB2 located below the measurement value MV and the like.

The first operation object OB1 is used for setting the measurement value MV at "0" at a desired position of the spindle 1C.

The second operation object OB2 is used for holding the displayed measurement value MV (keeping the displayed status) or releasing the holding.

Figure 3:
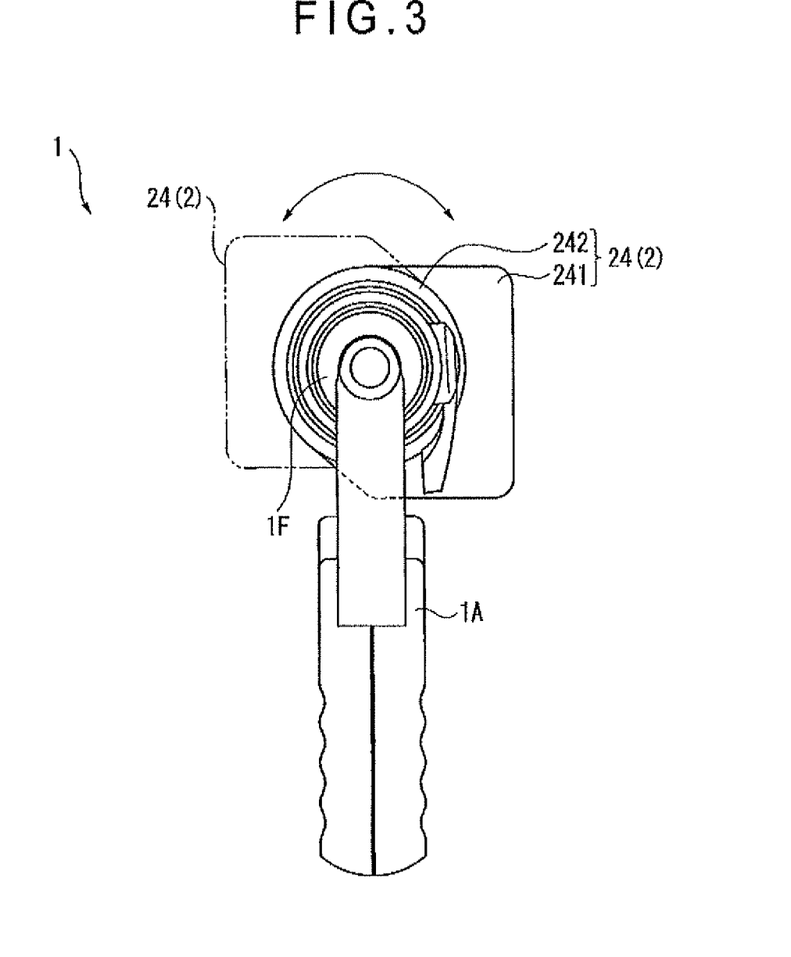
FIG. 3 illustrates a rotary motion of the digital display according to the exemplary embodiment.

FIG. 3 illustrates a rotary motion of the digital display 2. Specifically, FIG. 3 is a side elevation of the micrometer 1 seen from the left side in FIG. 1.

The support member 24 supports the components 21 to 23. As shown in FIG. 3, the support member 24 includes a support member body 241 and a rotary unit 242.

The support member body 241 is a substantially cuboid hollow member having an opening 241A (FIG. 1) on a side thereof. The components 21 to 23 are housed within the support member body 241 with the surface member 21 being exposed through the opening 241A.

The rotary unit 242 is integrally provided on a side of the support member body 241 opposite to the side on which the opening 241A is provided and is rotatably fitted to an outer circumference of the fixed sleeve 1B As shown in FIG. 3, the support member 24 rotates around the axis of the spindle 1C relative to the fixed sleeve 1B, so that the opening 241A is situated at the front side (right side in FIG. 3) of the micrometer 1 (an attitude represented by a solid line in FIG. 3), at the backside (left side in FIG. 3) of the micrometer 1 (an attitude represented by a two-dot chain line in FIG. 3) or the like.

In the following, for the sake of convenience of description, the attitude of the support member 24 ranging from the position where the opening 241A is situated at the front side of the micrometer 1 to a position where the opening 241A faces obliquely upper right side in FIG. 3 will be referred to as a "right-hand attitude": the attitude of the support member 24 ranging from the position where the opening 241A is situated at the backside of the micrometer 1 to a position where the opening 241A faces obliquely upper left side in FIG. 3 will be referred to as a "left-hand attitude."

Arrangement of Encoder

The encoder 3 detects the axial displacement of the spindle 1C.

Though not specifically illustrated, the encoder 3 is interposed between the fixed sleeve 1B and the spindle 1C and is arranged so that a signal corresponding to a relative rotary angle (angle corresponding to the axial displacement of the spindle 1C) of the spindle 1C against the fixed sleeve 1B can be obtained.

The encoder 3 is electrically connected to the control device 4 via a flexible board to output the signal corresponding to the relative rotary angle to the control device 4.

Arrangement of Control Device

FIG. 4 is a block diagram showing an arrangement of the control device 4.

The control device 4 controls the digital display 2. As shown in FIG. 4, the control device 4 includes a rotary position determining unit 41, a display controller 42 and the like.

The control device 4 is housed within the support member body 241 of the digital display 2.

The rotary position determining unit 41 recognizes the rotary position of the digital display 2 (support member 24) relative to the fixed sleeve 1B. In other words, the rotary position determining unit 41 recognizes whether the digital display 2 is set at the right-hand attitude or the left-hand attitude.

In this exemplary embodiment, the rotary position determining unit 41 recognizes the rotary position of the digital display 2 based on a signal outputted by a leaf switch 41A (FIG. 4).

The leaf switch 41A is attached to the support member 24. The leaf switch 41A is brought into mechanical interference (or non-interference) with the fixed sleeve 1B in accordance with the rotation of the digital display 2, so that the signal is not outputted (or is outputted) to the rotary position determining unit 41.

Incidentally, in this exemplary embodiment, the leaf switch 41A is configured not to output the signal to the rotary position determining unit 41 when the digital display 2 is situated in the right-hand attitude.

On the other hand, the leaf switch 41A is configured to output the signal to the rotary position determining unit 41 when the digital display 2 is situated in the left-hand attitude.

When the signal is not outputted from the leaf switch 41A, the rotary position determining unit 41 recognizes that the digital display 2 is situated in the right-hand attitude. When the signal is outputted from the leaf switch 41A, the rotary position determining unit 41 recognizes that the digital display 2 is situated in the left-hand attitude.

The display controller 42 controls the operation of the image display section 23 and displays an image (e.g. the image Fg shown in FIG. 2) on the image display section 23.

Specifically, the display controller 42 calculates the measurement value (a distance between the anvil 1E and the spindle 1C (i.e. a dimension of an object to be measured)) based on the signal (signal corresponding to the relative rotary angle of the spindle 1C against the fixed sleeve 1B) outputted by the encoder 3.

Further, the display controller 42 generates the image Fg including the calculated measurement value MV as well as the first and second operation objects OB1 and OB2 and displays the image Fg on the image display section 23.

The display controller 42 further recognizes a tapped position (coordinate) on the touch surface 21A based on the signal outputted by the electro-capacitance sheet 22. Then, the display controller 42 recognizes the pixel position in the image Fg corresponding to the tapped position and judges whether or not the tapped position is within the first and second operation objects OB1 and OB2.

When judging that the tapped position is within the first operation object OB1, the display controller 42 sets the measurement value MV at "0." Then, the display controller 42 calculates the measurement value MV with reference to the position of the spindle 1C when the measurement value is set at "0" based on the signal outputted by the encoder 3.

When judging that the tapped position is within the second operation object OB2, the display controller 42 holds the displayed measurement value MV or releases the holding.

Further, the display controller 42 inverts the top and bottom of the image Fg displayed on the image display section 23 in accordance with the recognition results of the rotary position determining unit 41 (i.e. whether the digital display 2 is set at the right-hand attitude or at the left-hand attitude).

Usage of Micrometer

Figure 5:
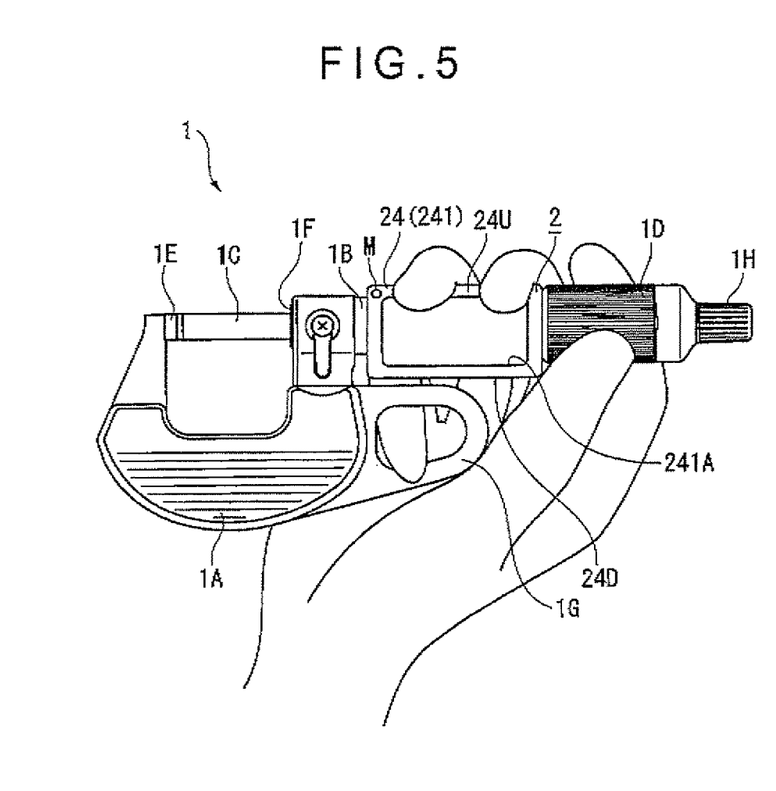
FIG. 5 is an illustration showing a usage of the micrometer according to the exemplary embodiment.
Figure 6:
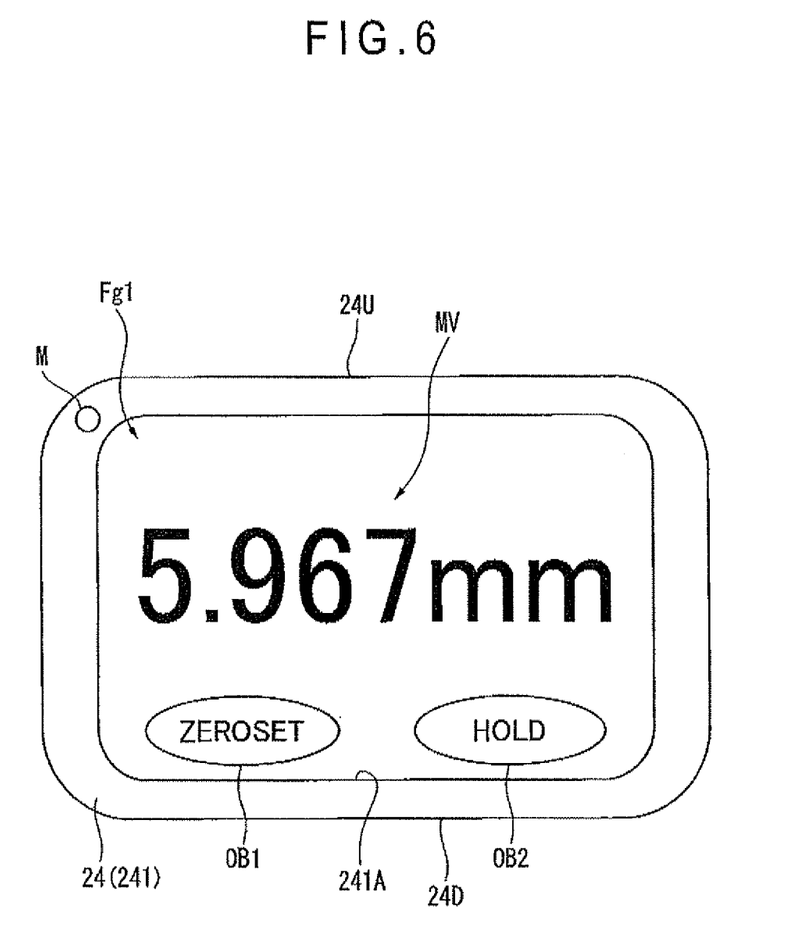
FIG. 6 is another illustration showing the usage of the micrometer according to the exemplary embodiment.
Figure 7:
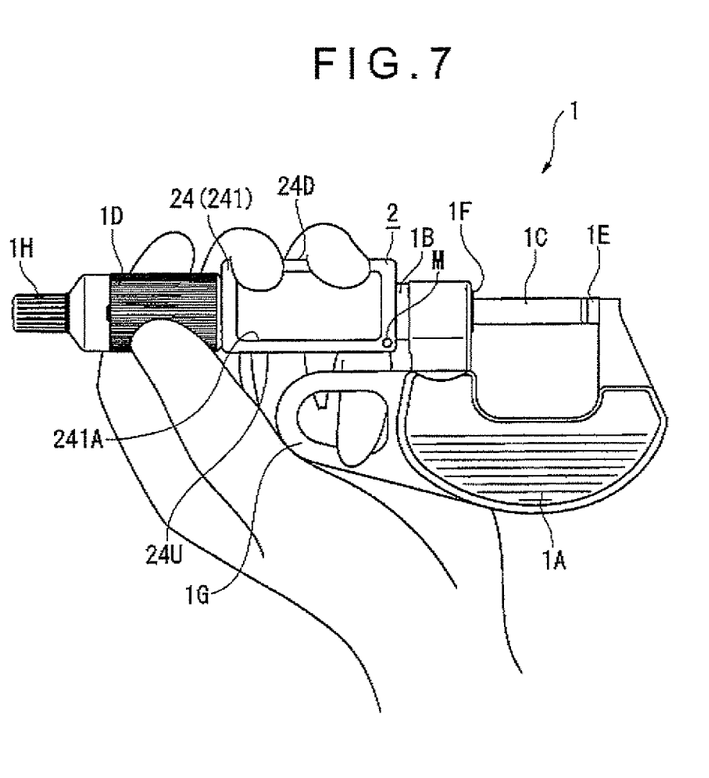
FIG. 7 is still another illustration showing the usage of the micrometer according to the exemplary embodiment.
Figure 8:
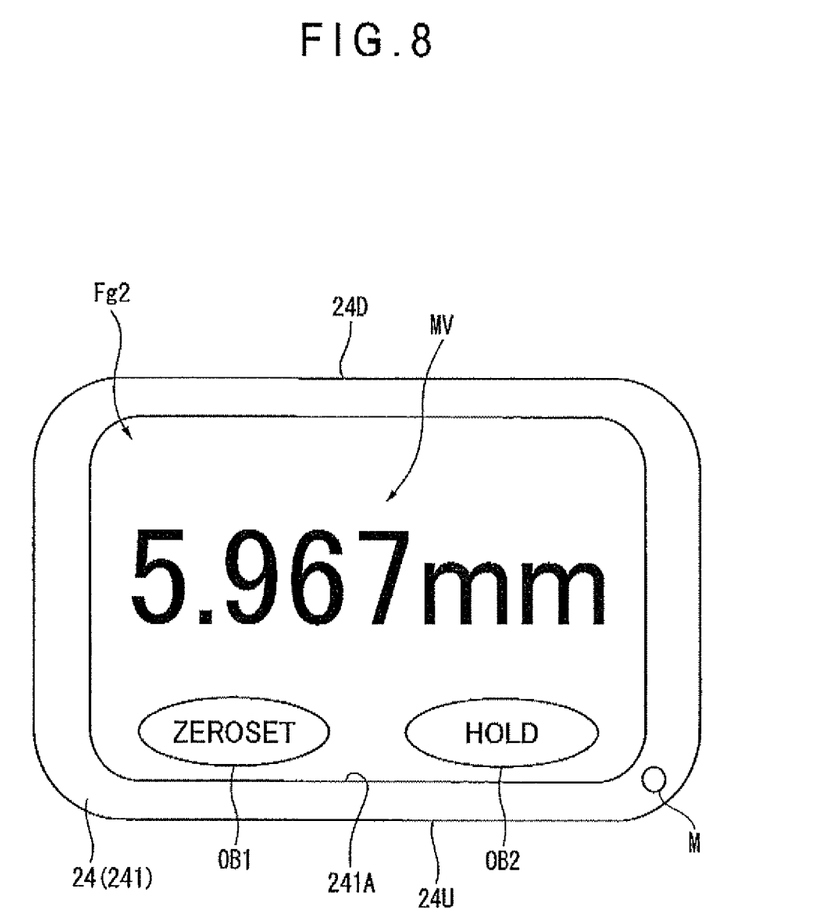
FIG. 8 is a further illustration showing the usage of the micrometer according to the exemplary embodiment.

FIGS. 5 to 8 are illustrations showing a usage of the micrometer 1. Specifically, FIG. 5 shows an example of the usage of the micrometer 1 only with a right hand. FIG. 6 illustrates an example of the image displayed on the digital display 2 in the usage shown in FIG. 5. FIG. 7 shows an example of the usage of the micrometer 1 only with a left hand. FIG. 8 illustrates an example of the image displayed on the digital display 2 in the usage shown in FIG. 7.

It should be noted that an upper end of the support member 24 in the condition shown in FIG. 1 is denoted as an "upper end 24U" and a lower end in the condition shown in FIG. 1 is denoted as a "lower end 24D" in FIGS. 5 to 8 for the convenience of description. Further, in FIGS. 5 to 8, for highlighting the difference between the usage only with a right hand and the usage only with a left hand, a mark M ("○") is provided on an upper left corner (in the condition shown in FIG. 1) of the side of the support member body 241 on which the opening 241A is provided.

Further, images displayed on the digital display 2 are not shown in FIGS. 5 to 8 as in FIG. 1.

Initially, when a user operates the micrometer 1 only with a right hand, the user rotates the digital display 2 so as to set the digital display 2 at the right-hand attitude as shown in FIG. 5.

Then, the user hooks the little finger into the finger rest 1G, applies a base of the thumb onto an outer circumference of the finger rest 1G and further applies the third finger and the middle finger onto an outer surface of the support member 24 to hold the micrometer 1 (finger rest 1G).

While holding the micrometer 1 as described above, the user pinches the thimble 1D or the ratchet knob 1H with the thumb and the index finger. Then, the user rotates the thimble 1D or the ratchet knob 1H so that an object to be measured (not illustrated) is held between the anvil 1E and the spindle 1C.

When the digital display 2 is set at the above-described attitude, since the signal is not outputted from the leaf switch 41A, the rotary position determining unit 41 recognizes that the digital display 2 is situated in the right-hand attitude.

Then, the display controller 42 displays an image Fg1 shown in FIG. 6 on the image display section 23.

Specifically, as shown in FIG. 6, the display controller 42 displays on the image display section 23 the image Fg1 in which the measurement value MV is located near the upper end 24U (i.e. a side remote from the finger rest 1G) and the first and second operation objects OB1 and OB2 are located near the lower end 24D (i.e. near the finger rest 1G).

On the other hand, when the user operates the micrometer 1 only with a left hand, the user rotates the digital display 2 so as to set the digital display 2 in the left-hand attitude as shown in FIG. 7.

Then, the user holds the micrometer 1 while hooking the little finger on the finger rest 1G in the same manner as the operation with the right hand.

While holding the micrometer 1 as described above, the user rotates the thimble 1D or the ratchet knob 1H with the thumb and the index finger so that the object to be measured is held between the anvil 1E and the spindle 1C.

When the digital display 2 is set at the above-described attitude, since the signal is outputted from the leaf switch 41A, the rotary position determining unit 41 recognizes that the digital display 2 is situated in the left-hand attitude.

Then, the display controller 42 displays an image Fg2 shown in FIG. 8 on the image display section 23.

Specifically, as shown in FIG. 8, the display controller 42 displays on the image display section 23 the image Fg2 in which the measurement value MV is located near the lower end 24D (i.e. a side remote from the finger rest 1G) and the first and second operation objects OB1 and OB2 are located near the upper end 24U (i.e. near the finger rest 1G).

In other words, the image Fg2 displayed in the left-hand attitude is a vertically inverted image of the image Fg1 displayed in the right-band attitude.

The following advantages can be obtained according to the above-described exemplary embodiment.

In the exemplary embodiment, the digital display 2 (support member 24) that displays the image Fg including the measurement value MV is rotatably attached to the fixed sleeve 1B.

Accordingly, irrespective of whether operating the micrometer 1 only with a right hand or operating the micrometer 1 only with a left hand, the user can read the measurement value MV by rotating the digital display 2 relative to the fixed sleeve 113 so that the digital display 2 is situated at a position at which the image Fg is visible.

Further, the digital display 2 is provided by a so-called touch panel including the image display section 23, the surface member 21 and the electro-capacitance sheet 22.

Thus, the operation button such as the typical reset button and hold button can be displayed in the form of the operation objects OB1 and OB2 in addition t to the measurement value MV on the image display section 23. In other words, by tapping the operation objects OB1 and OB2 displayed on the image display section 23 (i.e. pressing the position on the touch surface 21A corresponding to the operation objects OB1 and OB2), the same function as those provided when typical operation buttons such as the reset button and the hold button are pressed can be provided.

When the image Fg including the operation objects OB1 and OB2 is displayed on the image display section 23, the user can locate the digital display 2 at a position capable of visually recognizing the operation objects OB1 and OB2 in addition to the measurement value MV by rotating the digital display 2 relative to the fixed sleeve 1B.

Thus, irrespective of which hand (i.e. only a right hand or only a left hand) of the user is used for operating the micrometer 1, the measurement value MV can be read and the operation objects OB1 and OB2 can be tapped, so that usability of the micrometer 1 can be enhanced.

Further, since the control device 4 includes the rotary position determining unit 41 and the display controller 42, the orientation from the top to the bottom of the images Fg1 and Fg2 visually recognized by the user can be aligned with the orientation in the vertical direction irrespective of which hand (i.e. only a right hand or only a left hand) is used by the user.

Accordingly, an erroneous reading of the measurement value MV by the user or an erroneous recognition of the operation objects OB1 and OB2 can be avoided.

The rotary position determining unit 41 recognizes the rotary position of the digital display 2 (i.e. the right-hand attitude and the left hand attitude) in accordance with the presence or absence of the signal from the leaf switch 41A.

In other words, it is only necessary for the user to rotate the digital display 2 in order to have the control device 4 (the rotary position determining unit 41) recognize the rotary position of the digital display 2.

Thus, it is not necessary to force a user to operate the operation objects or operation buttons after rotating the digital display 2 in order to recognize the rotary position of the digital display 2.

Further, the leaf switch 41A is configured not to output the signal to the rotary position determining unit 41 when the digital display 2 is situated in a range capable of visually recognizing the image Fg from the front side (i.e. when being set at the right-hand attitude). On the other hand, the leaf switch 41A is configured to output the signal to the rotary position determining unit 41 when the digital display 2 is situated in a range capable of visually recognizing the image Fg from the backside (i.e. when being set at the left-hand attitude).

Accordingly, when the digital display 2 is rotated to change the position of the digital display 2 so that the image Fg is easily visible (i.e. change the position of the digital display 2 within a range capable of visually recognizing the image Fg from the front side) while the user operates the micrometer 1 only with a right hand, the vertical orientation of the image Fg is not inverted.

The same applies while the user operates the micrometer 1 only with a left hand.

Further, the leaf switch 41A is configured not to output the signal to the rotary position determining unit 41 only when the digital display 2 is situated in the right-hand attitude. In other words, when the leaf switch 41A goes wrong, since the signal is not outputted from the leaf switch 41A, the rotary position determining unit 41 recognizes that the digital display 2 is situated in the right-hand attitude.

It is expected that the micrometer 1 is more frequently used only with a right hand than only with a left hand. Accordingly, since the output of the signal from the leaf switch 41A is stopped only when being set in the right-hand attitude, even when the leaf switch 41A goes wrong, the image Fg1 adapted for the (minimum required) operation only with a right hand can be displayed on the image display section 23.

Further, since the finger rest 1G is provided near the second end of the body 1A, the user can hold the micrometer 1 while hooking the little finger on the finger rest 1G (i.e. without touching the body 1A).

Accordingly, heat is not directly transferred from the hand of the user to the body 1A and, consequently, thermal expansion of the body 1A can be avoided. Accordingly, an error in the measurement value MV due to the thermal expansion of the body 1A can be avoided and an object can be highly accurately measured.

It should be understood that the scope of the invention is not limited to the above exemplary embodiment, but includes modifications and improvements as long as an object of the invention can be achieved.

Though the image display section 23 includes the LCD device 23A and the backlight 23B in the above exemplary embodiment, the image display section 23 may alternatively include an organic EL (electroluminescence) display panel, an electronic paper and the like.

Though the electro-capacitance sheet 22 is used for the position sensor in the above exemplary embodiment, the tapped position on the touch surface 21A may be detected without using an electro-capacitance but with other method.

For instance, the tapped position may be detected by an infrared method in which a matrix of infrared optical axes is formed on the touch surface 21A with the use of emitting elements and light-receiving elements and whether one or more of the optical axes is shielded or not is detected.

Alternatively, a resistance film method may be employed, in which a pair of sheets with transparent conductive films are disposed in a face-to-face manner and the contact location of the sheets when the touch surface 21A is touched is detected.

Though the two (i.e. first and second) operation objects OB1 and OB2 are included in the image Fg in addition to the measurement value MV, other arrangement is possible. For instance, the image Fg may include only one of the first and second operation objects OB1 and OB2, or the image Fg may include operation object(s) other than the first and second operation objects OB1 and OB2.

Though the rotary position determining unit 41 recognizes the rotary position of the digital display 2 in accordance with the presence or absence of the signal from the leaf switch 41A, other arrangement is possible.

For instance, emitting elements and light-receiving elements may be used instead of the leaf switch 41A so that the light emitted from the emitting elements to the light-receiving elements is transmitted or shielded in accordance with the rotation of the digital display 2. Then, the rotary position determining unit 41 may recognize the rotary position of the digital display 2 in accordance with the signal outputted from the light-receiving elements.

An operation object that allows a user to set whether the micrometer 1 is to be used in the right-hand attitude or the left-hand attitude may be included in the image Fg and the rotary position determining unit 41 may recognize the rotary position of the digital display 2 in accordance with the operation on the operation object by the user.

Though the finger rest 1G is provided with a substantially U-shape in the above exemplary embodiment, the finger rest 1G may be shaped in any manner as long as the finger rest 1G bulges in the axial direction of the spindle 1C so that the little finger can be hooked.

What is claimed is:

1. A micrometer comprising:
   a U-shaped body;
   an anvil provided on a first end of the body;
   a fixed sleeve fixed on a second end of the body;
   a spindle that is screwed into the fixed sleeve and advances and retracts in an axial direction thereof;
   a displacement detector that detects a displacement of the spindle;
   a display device that is rotatably attached to the fixed sleeve; and
   a control device that controls the display device, wherein the display device comprises:
   an image display section that displays an image including a measurement value based on the displacement detected by the displacement detector;
   a surface member that faces the image display section and has a touch surface;
   a position sensor that detects a position pressed on the touch surface; and
   a support member that supports the image display section, the surface member and the position sensor with the touch surface being exposed to an outside, the support member being rotatably attached to the fixed sleeve.

2. The micrometer according to claim 1, wherein
   the control device comprises:
   a rotary position determining unit that recognizes a rotary position of the support member relative to the fixed sleeve; and
   a display controller that displays an image on the image display section, wherein
   the display controller inverts an upper side and a lower side of the image displayed on the image display section in accordance with the rotary position of the support member recognized by the rotary position determining unit.

3. The micrometer according to claim 1, wherein
   a finger rest that bulges from an outer circumference of the U-shaped body in the axial direction of the spindle is provided on the second end of the body.

4. The micrometer according to claim 2, wherein
   a finger rest that bulges from an outer circumference of the U-shaped body in the axial direction of the spindle is provided on the second end of the body.

* * * * *